(12) United States Patent
Woellert et al.

(10) Patent No.: US 7,452,031 B2
(45) Date of Patent: Nov. 18, 2008

(54) MULTI-ADJUSTABLE CHILD SEAT WITH DETACHABLE SOFTGOODS ATTACHMENT

(75) Inventors: Thomas Woellert, Union, OH (US); David Sander, Liberty Township, OH (US); Peter Eros, Vandalia, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 0 days.

(21) Appl. No.: 11/595,796

(22) Filed: Nov. 10, 2006

(65) Prior Publication Data
US 2008/0111412 A1 May 15, 2008

(51) Int. Cl.
A47D 1/10 (2006.01)
A47D 15/00 (2006.01)
A47C 7/38 (2006.01)
A47C 31/02 (2006.01)
A62B 35/00 (2006.01)

(52) U.S. Cl. .............................. 297/250.1; 297/256.11; 297/353; 297/410; 297/484; 297/218.1; 297/218.3; 297/218.5

(58) Field of Classification Search .............. 297/250.1, 297/256.1, 256.11, 484, 353, 410, 218.1
See application file for complete search history.

(56) References Cited

U.S. PATENT DOCUMENTS

| | | | | |
|---|---|---|---|---|
| 3,722,950 A * | 3/1973 | Harnick | .................... | 297/218.1 |
| 5,974,636 A * | 11/1999 | Brown et al. | .......... | 297/218.1 X |
| 6,030,047 A * | 2/2000 | Kain | ........................... | 297/484 |
| 6,033,027 A * | 3/2000 | Conner et al. | ......... | 297/218.1 X |
| 6,398,302 B1 * | 6/2002 | Freedman et al. | ....... | 297/250.1 |
| 6,491,348 B1 * | 12/2002 | Kain | ........................... | 297/484 |
| 6,623,074 B2 * | 9/2003 | Asbach et al. | ........... | 297/250.1 |
| 6,626,493 B2 * | 9/2003 | Kain | ........................ | 297/250.1 |
| 6,688,685 B2 * | 2/2004 | Kain | ........................ | 297/250.1 |
| 6,726,278 B1 * | 4/2004 | Albright et al. | .......... | 297/218.1 |
| 6,779,843 B2 * | 8/2004 | Kain | ........................ | 297/250.1 |
| 7,021,710 B2 * | 4/2006 | Kain et al. | ............. | 297/256.11 |
| 7,055,903 B2 * | 6/2006 | Balensiefer et al. | .... | 297/256.11 |
| 7,066,536 B2 * | 6/2006 | Williams et al. | ......... | 297/250.1 |
| 7,195,314 B2 * | 3/2007 | Spence et al. | ............ | 297/250.1 |
| 7,232,185 B2 * | 6/2007 | Hartenstine et al. | ...... | 297/250.1 |
| 7,246,852 B2 * | 7/2007 | Balensiefer | .............. | 297/250.1 |
| 7,246,854 B2 * | 7/2007 | Dingman et al. | ......... | 297/250.1 |
| 7,249,803 B2 * | 7/2007 | Jane Santamaria | .... | 297/250.1 X |
| 7,261,376 B2 * | 8/2007 | Kespohl | .............. | 297/250.1 X |
| 7,278,683 B2 * | 10/2007 | Williams et al. | ......... | 297/250.1 |
| 7,300,113 B2 * | 11/2007 | Baloga et al. | ......... | 297/250.1 X |
| 7,306,284 B2 * | 12/2007 | Horton et al. | ............ | 297/250.1 |
| 7,322,647 B2 * | 1/2008 | Munn et al. | .............. | 297/250.1 |
| 7,370,912 B2 * | 5/2008 | Williams et al. | ....... | 297/256.11 |
| 7,380,877 B2 * | 6/2008 | Konig et al. | ............. | 297/250.1 |
| 2002/0024243 A1 * | 2/2002 | Peterson | .............. | 297/218.1 X |
| 2003/0151282 A1 * | 8/2003 | Williams et al. | ......... | 297/250.1 |
| 2003/0164631 A1 * | 9/2003 | Sedlack | .................. | 297/250.1 |
| 2004/0070244 A1 * | 4/2004 | Williams et al. | ......... | 297/250.1 |

(Continued)

Primary Examiner—Rodney B. White
(74) Attorney, Agent, or Firm—Taft Stettinius & Hollister LLP

(57) ABSTRACT

Disclosed are child seats with adjustable features to accommodate a child. Specifically, a child seat with adjustable headrest unit, a child seat with adjustable backrest unit, a child seat with adjustable armrest unit, a child seat with adjustable lap depth, a child seat with a softgoods attachment, and a method of attaching a softgoods attachment to a child seat.

10 Claims, 14 Drawing Sheets

U.S. PATENT DOCUMENTS

| | | | |
|---|---|---|---|
| 2004/0124676 A1* | 7/2004 | Kain | 297/250.1 |
| 2004/0189068 A1* | 9/2004 | Meeker et al. | 297/250.1 |
| 2004/0207241 A1* | 10/2004 | Sedlack | 297/250.1 |
| 2004/0212232 A1* | 10/2004 | Sedlack | 297/250.1 |
| 2004/0217636 A1* | 11/2004 | Sedlack | 297/250.1 |
| 2005/0082888 A1* | 4/2005 | Williams et al. | 297/250.1 |
| 2005/0225136 A1* | 10/2005 | Horton et al. | 297/250.1 |
| 2005/0264062 A1* | 12/2005 | Longenecker et al. | 297/250.1 |
| 2006/0181120 A1* | 8/2006 | Schimmoller et al. | 297/250.1 X |
| 2006/0261650 A1* | 11/2006 | Billman et al. | 297/250.1 |
| 2006/0261651 A1* | 11/2006 | Nolan et al. | 297/250.1 |
| 2007/0040428 A1* | 2/2007 | Sakumoto | 297/250.1 |
| 2007/0228788 A1* | 10/2007 | Meeker et al. | 297/250.1 |
| 2007/0236061 A1* | 10/2007 | Meeker et al. | 297/250.1 |
| 2007/0246982 A1* | 10/2007 | Nett et al. | 297/250.1 |
| 2007/0284925 A1* | 12/2007 | Balensiefer | 297/256.11 |
| 2008/0030054 A1* | 2/2008 | Williams et al. | 297/250.1 |
| 2008/0067843 A1* | 3/2008 | Baloga et al. | 297/250.1 X |

* cited by examiner

MULTI-ADJUSTABLE CHILD SEAT WITH DETACHABLE SOFTGOODS ATTACHMENT

FIELD OF THE INVENTION

The present invention generally relates to the field of child seats with adjustable features to accommodate a child. Specifically, the present invention relates to a child seat with adjustable headrest unit, a child seat with adjustable backrest unit, a child seat with adjustable armrest unit, a child seat with adjustable lap depth, a child seat with a softgoods attachment, and a method of attaching a softgoods attachment to a child seat.

BACKGROUND OF THE INVENTION

Many types of child seats are currently available in the market. Child seats are typically designed to be used in conjunction with a vehicle, such as a automobile. Child seats usually allow for the child to be seated either by utilizing the vehicle's lap and/or shoulder seat belt to secure the child to the car and seat and/or can include an internal harness to secure the child to the seat wherein the shoulder/seat belt holds the child seat in the car.

As a child gets older and begins to physically grow, he will eventually become too big to comfortably fit in his old child seat. Accordingly, sometimes it will be necessary to change sizes of seats, generally from an infant seat, to a convertible seat, to a child booster seats. The inventions disclosed herein may be suitable for use in each depending on the designs thereof.

Alternatively, it is possible that a single seat may be able to be used for multiple sized children using some of the adjustment inventions disclosed and claimed herein.

Known child seats include those having backrests, armrests, seatrests, and cushions. Some of these known child seat also have features allowing for the adjustment of the above features. However, these adjustment features are usually difficult to use.

Additionally, known child seats do not provide an easily detachable softgoods attachment for easy cleaning of the child seat fabric that come in contact with a child. Many times, a child using a child seat spills food or drink onto the child seat. By having a mechanism to easily remove the softgoods attachment, the child seat may be easily cleaned or replaced.

For these reasons, what is needed is an improved multi-adjustable child seat. Also, what is needed is a child seat with user or child adjustable features. Further, what is needed is a child seat with an easily detachable softgoods attachment.

SUMMARY OF THE INVENTION

The present invention solves the above problems by providing an easily adjustable child seat with softgoods attachment.

In one embodiment of the present invention, the present invention is a child seat with adjustable headrest unit, comprising a headrest section having a base member, a backrest section having a receiving channel adapted to receive the base member, a plurality of channel teeth coupled to the receiving channel, and an adjustment lever pivotally coupled to the base member at a pivot point, the adjustment lever having a trigger end and a locking flange end; wherein engaging the trigger end causes the adjustment lever to pivot about the pivot point and simultaneously causes the locking flange end to disengage from the plurality of channel teeth, thereby allowing a user to adjust the headrest section relative to and in the same plane as the backrest section, and wherein disengaging the trigger end causes the adjustment lever to pivot about the pivot point and simultaneously causes the locking flange end to engage at least one of the plurality of channel teeth, thereby restricting a user from adjusting the headrest section relative to and in the same plane as the backrest section.

An additional aspect of this embodiment may include a belt guide coupled to the headrest section, the belt guide adapted to receive an automobile belt for securing the child seat to an automobile seat. Another aspect of this embodiment may include a light source coupled to the belt guide, the light source having an electricity source and a switch to allow or restrict electricity from the electricity source to power the light source. Further, this embodiment may include a softgoods attachment removably coupled to the headrest section. Still further, this embodiment may include a fabric covering permanently or removably coupled to the softgoods attachment.

In another embodiment of the present invention, the present invention is a child seat with adjustable backrest unit, comprising a lower backrest section, an upper backrest section having a receiving channel adapted to receive the lower backrest section, a plurality of receiving notches coupled to the lower backrest section, and an adjustment lever pivotally coupled to the upper backrest section at a pivot point, the adjustment lever having a trigger end and a locking flange end; wherein engaging the trigger end causes the adjustment lever to pivot about the pivot point and simultaneously causes the locking flange end to disengage from the plurality of receiving notches, thereby allowing a user to adjust the upper backrest section relative to and in the same plane as the lower backrest section, and wherein disengaging the trigger end causes the adjustment lever to pivot about the pivot point and simultaneously causes the locking flange end to engage at least one of the plurality of receiving notches, thereby restricting a user from adjusting the upper backrest section relative to and in the same plane as the lower backrest section.

This embodiment may include a softgoods attachment removably coupled to the upper backrest section allowing the softgoods to be separately attachable to the seat to provide a cleaner and smoother look. Also, this embodiment may include a fabric covering permanently or removably coupled to the softgoods attachment. Further, this embodiment may include a seatrest section, adapted for a child to sit upon the seatrest section, wherein seatrest section is removably coupled to the lower backrest section.

In yet another embodiment of the present invention, the present invention is a child seat with adjustable armrest unit, comprising an armrest member, an adjustment lever pivotally coupled to the armrest member at a pivot point, the adjustment lever having a trigger end and a locking flange end, a seatrest section having a side portion, a receiving channel, coupled to the side portion of the seatrest section, adapted to receive the armrest member, and at least one receiving notch coupled to the receiving channel; wherein engaging the trigger end causes the adjustment lever to pivot about the pivot point and simultaneously causes the locking flange end to disengage from the at least one receiving notch, thereby allowing a user to adjust the armrest member relative to and in the same plane as the side portion of the seatrest section, and wherein disengaging the trigger end causes the adjustment lever to pivot about the pivot point and simultaneously causes the locking flange end to engage the at least one receiving notch, thereby restricting a user from adjusting the armrest member relative to and in the same plane as the side portion of the seatrest section.

In still yet another embodiment of the present invention, the present invention is a child seat with softgoods attachment, comprising a child seat shell, a softgoods attachment, and at least one connector coupled to the softgoods attachment, the at least one connector being capable of releasably connecting the softgoods attachment to the seat shell. The softgoods attachment may include a base of any suitable material such as closed cell foam, open cell foam, padding, etc. and may or may not be covered in a fabric-type covering. In this embodiment, the connector may be any type of suitable connector including, but not limited to, a threaded type connector. The threaded type connector may have a base end and a threaded end such that the base end has a larger diameter than the threaded end; wherein the softgoods attachment includes at least one softgoods opening adapted to allow the threaded end of at least one twist connector to pass through the softgoods attachment, while restricting the base end of the at least one twist connector, and wherein the child seat shell includes at least one shell opening adapted to receive the threaded end of the at least one crew mechanism, whereby the softgoods attachment is removably coupled to the child seat shell by means of the at least one twist connector. Additionally, this embodiment may include a fabric covering permanently or removably coupled to the softgoods attachment.

Another embodiment of the present invention is a method of attaching a softgoods attachment to a child seat, the method comprising the steps of (a) placing a softgoods attachment proximate a child seat shell, (b) aligning at least one connector coupled to the softgoods attachment with at least one shell opening of the child seat shell, (c) connecting the softgoods attachment to the shell thereby giving a smooth, clean fit between the softgoods attachment and the shell.

Yet another embodiment of the present invention is a child seat with adjustable lap depth, comprising a backrest section having a top end and a bottom end, a coupling mechanism, a seatrest section, the seatrest section having a front end, a back end removably coupled to the coupling mechanism, a locking flange coupled to the receiving channel, and a receiving channel adapted to receive the coupling mechanism, at least one receiving notch coupled to the coupling mechanism, and an adjustment mechanism coupled to the front end of the seatrest section; wherein the receiving channel of the seatrest section is slidably coupled to the coupling mechanism, wherein engaging the adjustment mechanism causes the locking flange to disengage from the at least one receiving notch, thereby allowing a user to adjust the seatrest section relative to the backrest section, and wherein disengaging the adjustment mechanism causes the locking flange to engage the at least one receiving notch, thereby restricting a user from adjusting the seatrest section relative to the backrest section.

This embodiment may also include at least one softgoods attachment coupled to each of the backrest section and seatrest section. Additionally, this embodiment may include a fabric covering permanently or removably coupled to the softgoods attachment.

From the foregoing disclosure and the following detailed description of various preferred embodiments it will be apparent to those skilled in the art that the present invention provides a significant advance in the art of child seats. Additional features and advantages of various preferred embodiments will be better understood in view of the detailed description provided below.

BRIEF DESCRIPTION OF THE DRAWINGS

The present invention will be understood and appreciated more fully from the detailed description in conjunction with the following drawing in which.

Figure 1:
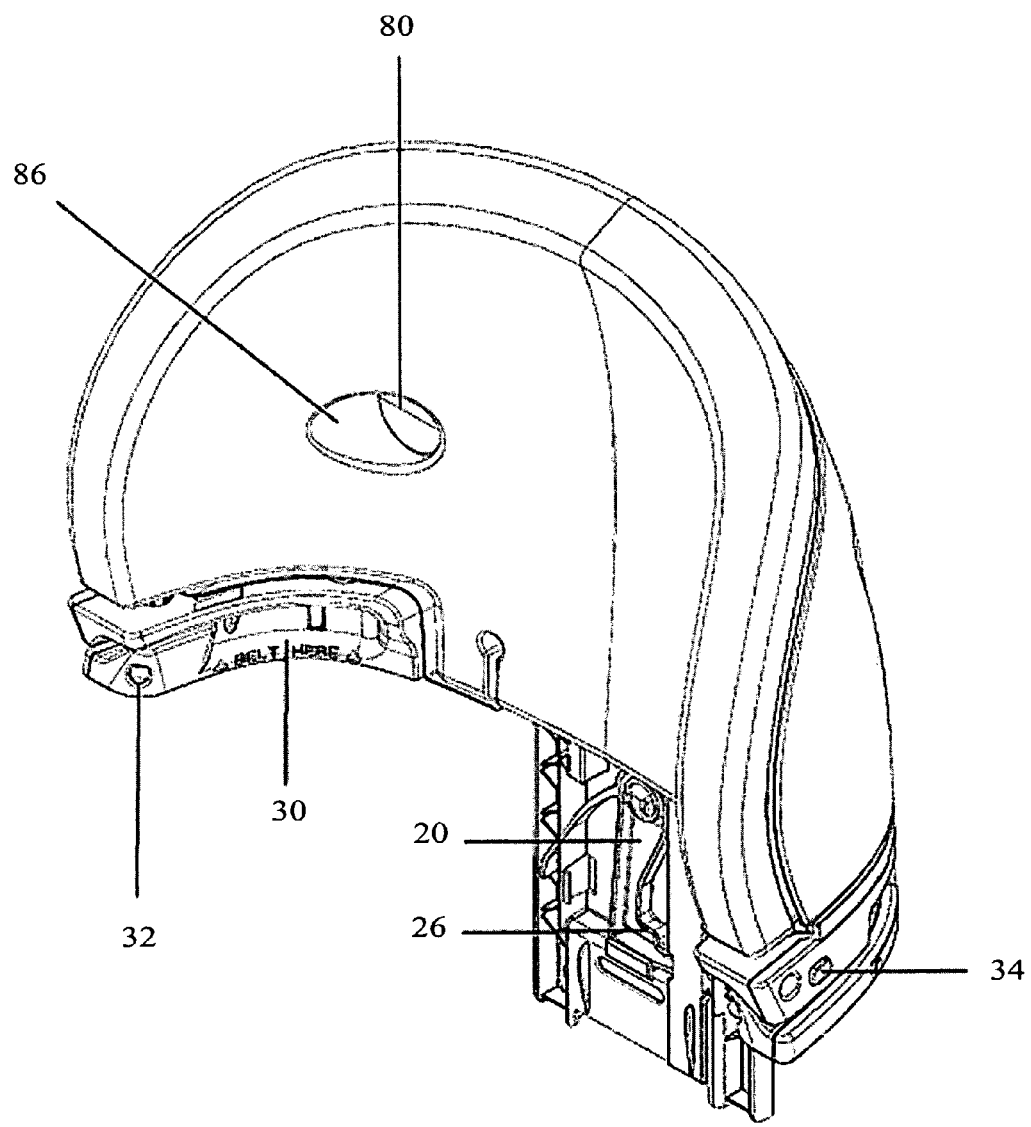
FIG. 1 is a perspective view of the adjustable headrest unit.
Figure 2:
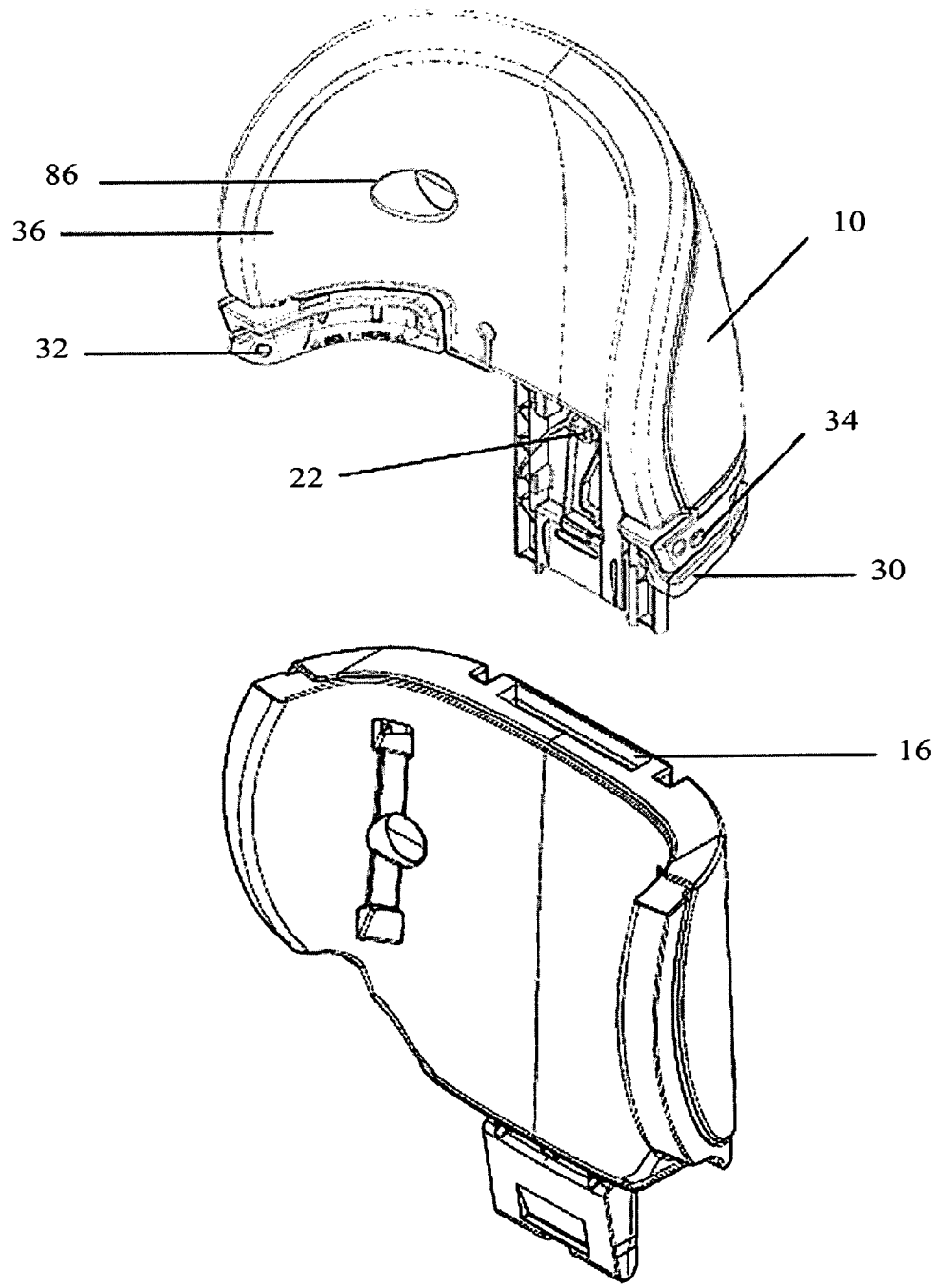
FIG. 2 is an additional perspective view of the adjustable headrest unit.
Figure 3:
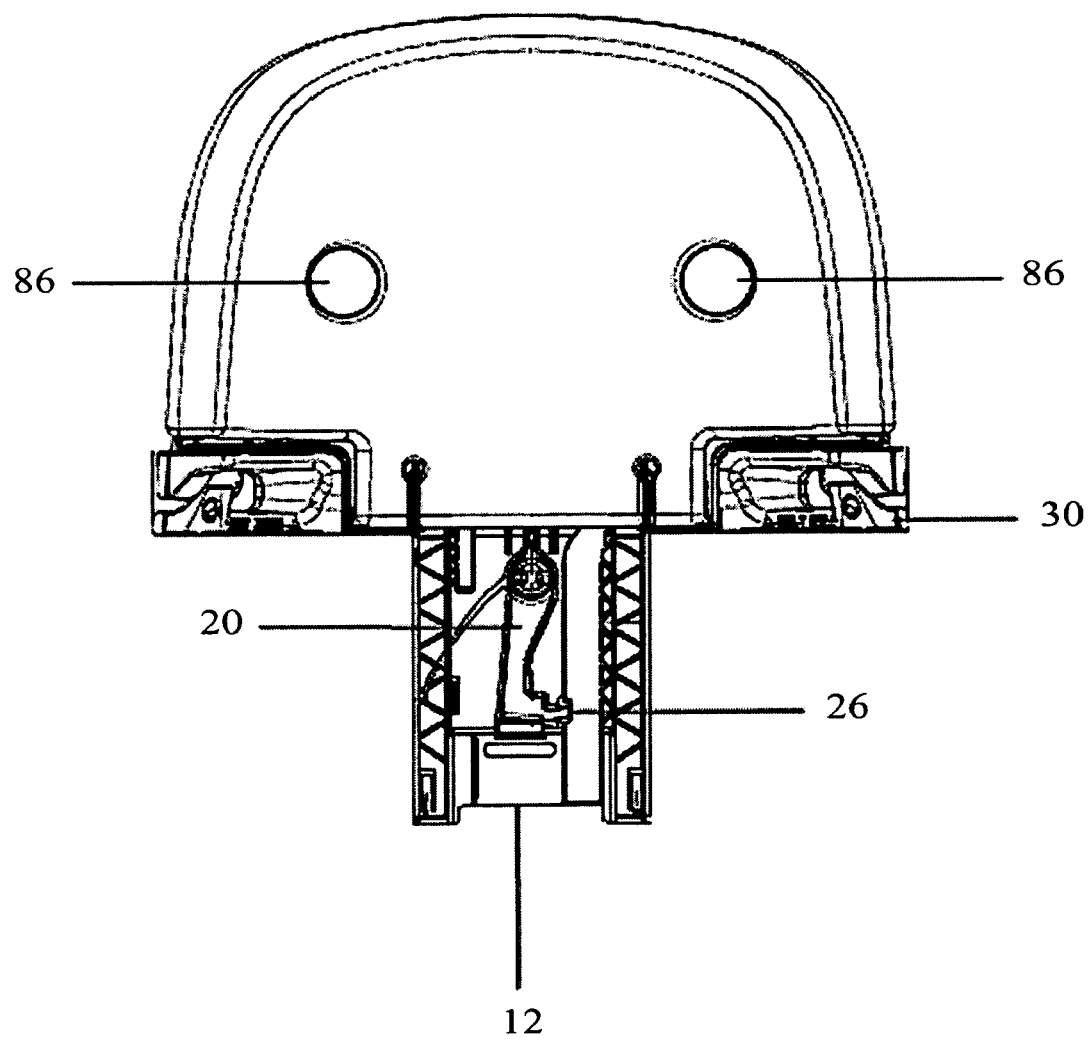
FIG. 3 is a view of the adjustable headrest unit as seen from the front of the unit.
Figure 4:
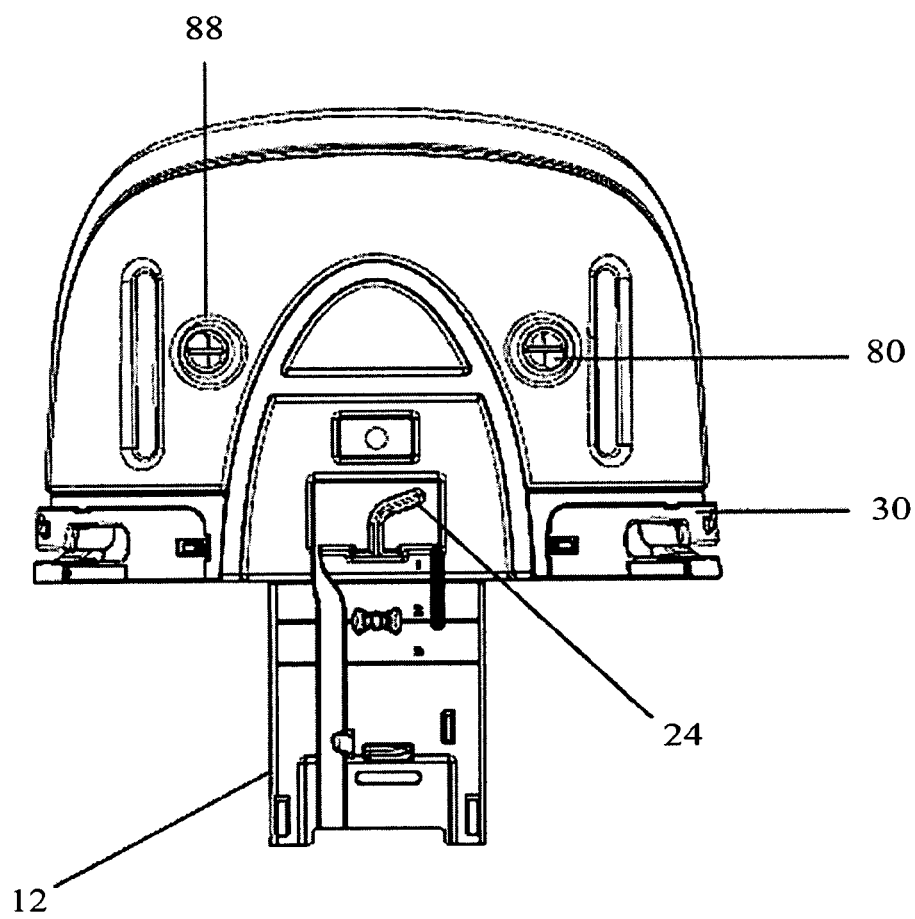
FIG. 4 is a view of the adjustable headrest unit as seen from the back of the unit.
Figure 5:
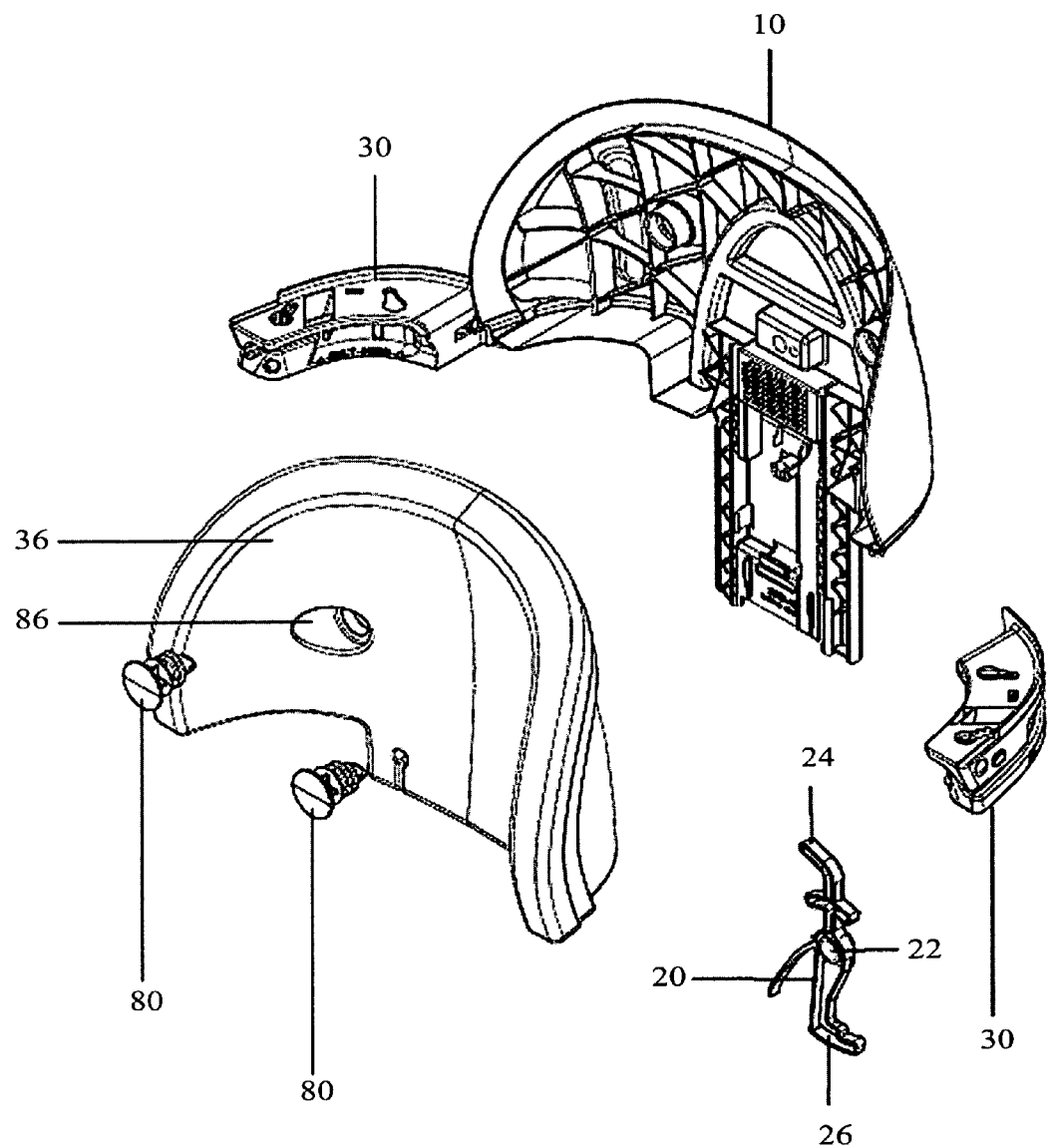
FIG. 5 is an exploded view of the adjustable headrest unit, illustrating one embodiment of the headrest section having a base member, an adjustment lever having a trigger end and a locking flange end, and a belt guide.
Figure 6:
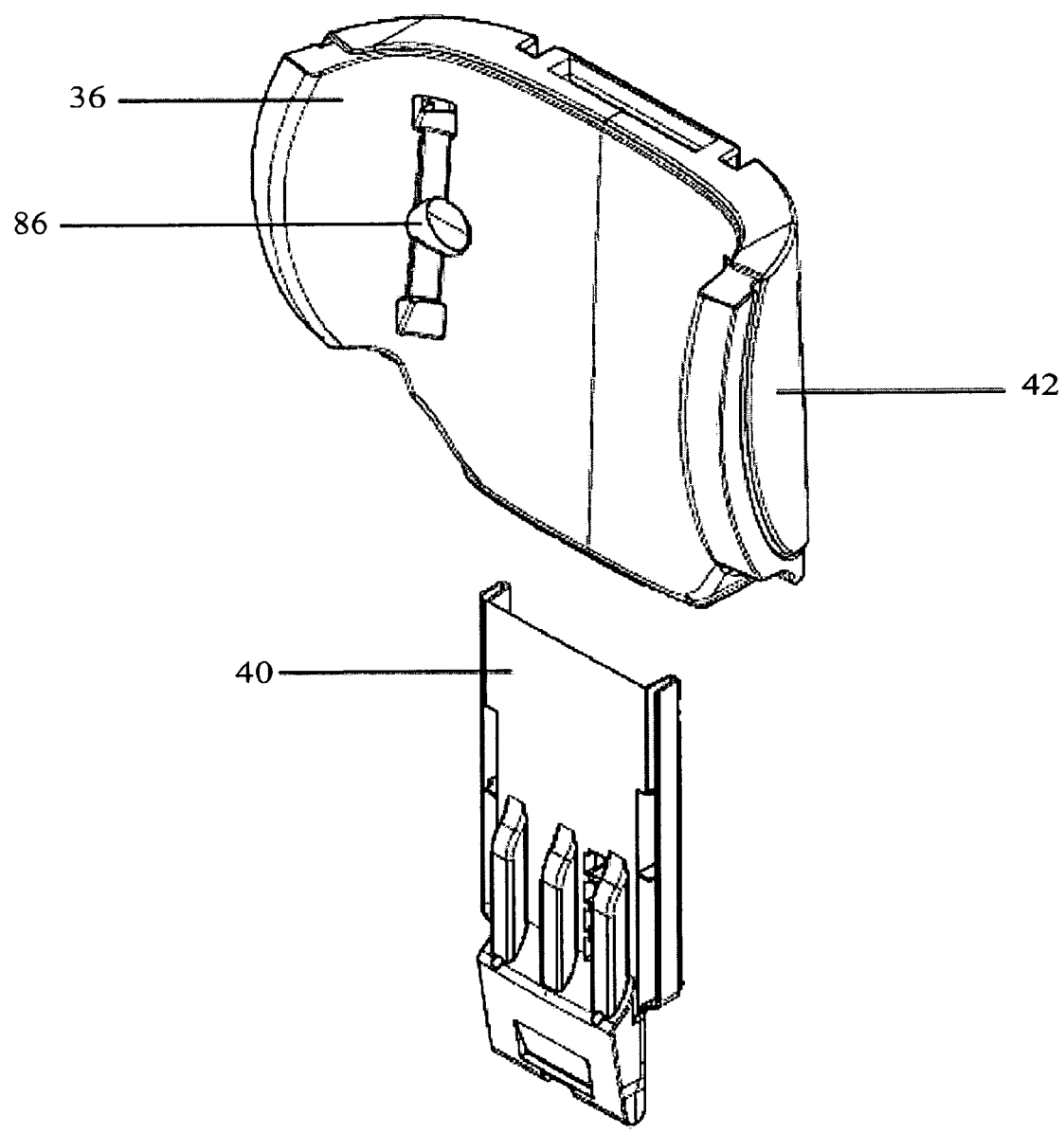
FIG. 6 is a perspective view of the adjustable backrest unit, including both upper backrest section and lower backrest section.
Figure 7:
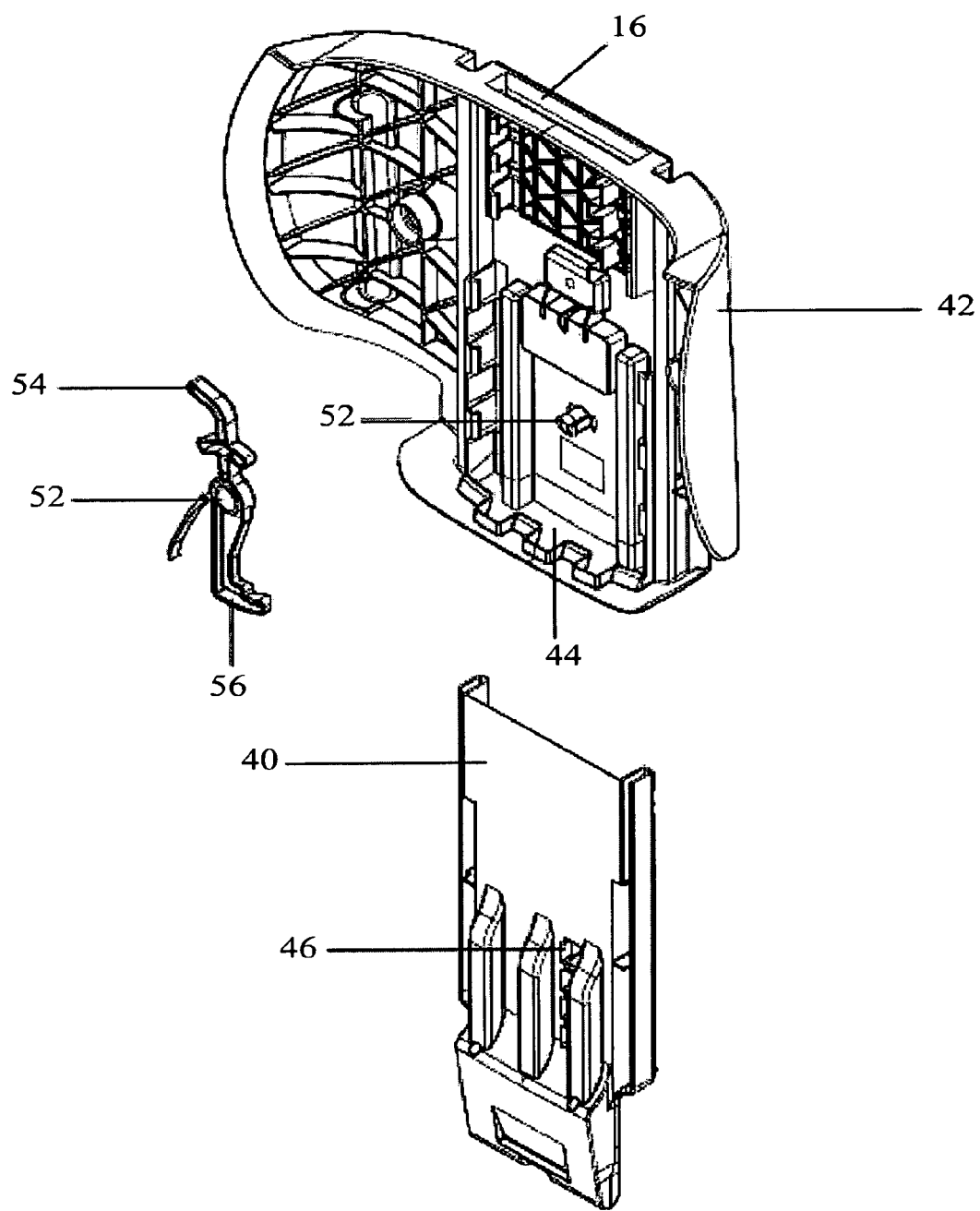
FIG. 7 is an exploded perspective view of the adjustable backrest unit, including both upper backrest section and lower backrest section.
Figure 8:
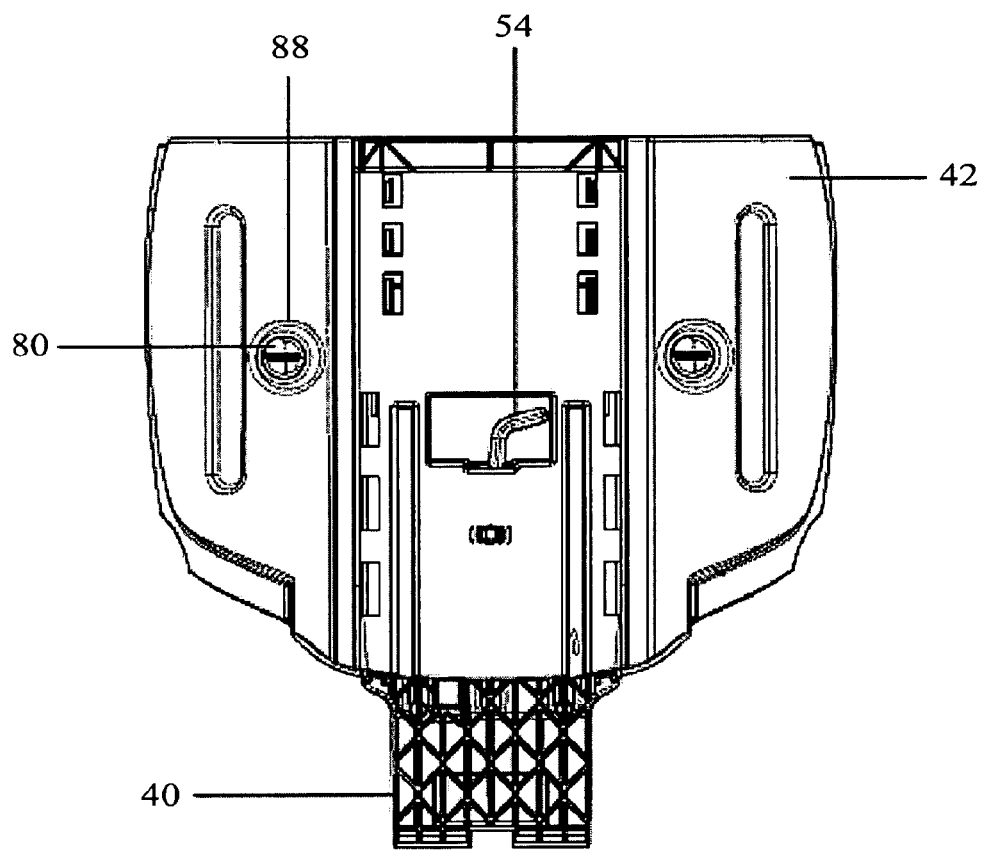
FIG. 8 is a view of the adjustable backrest unit as seen from the back of the unit. This view shows the upper backrest section and lower backrest section engaged.
Figure 9:
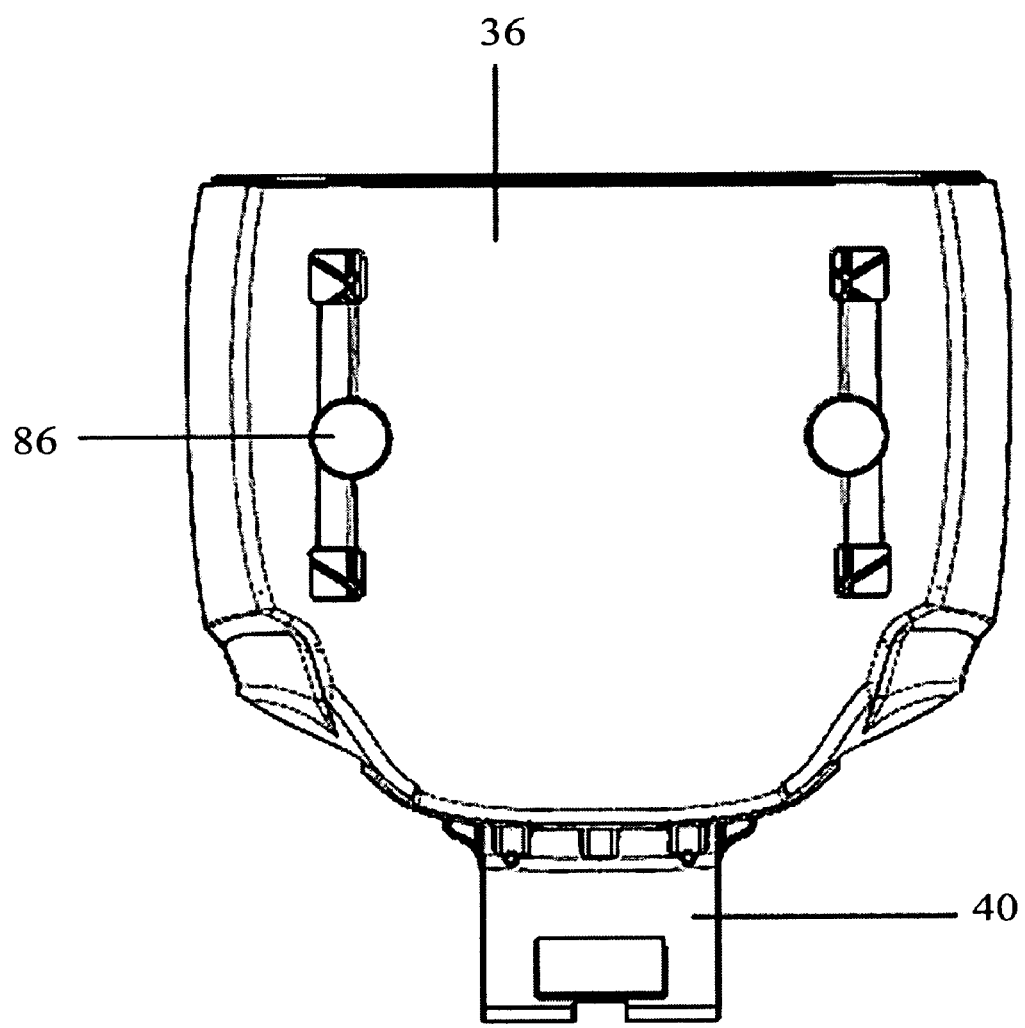
FIG. 9 is a view of the adjustable backrest unit as seen from the front of the unit. This view shows the upper backrest section and lower backrest section engaged.

It should be understood that the appended drawings are not necessarily to scale, presenting a somewhat simplified representation of various preferred features illustrative of the basic principles of the invention. All references to direction and position, unless otherwise indicated, refer to the orientation of the object illustrated in the drawings.

DETAILED DESCRIPTION OF THE DRAWINGS

It will be apparent to those skilled in the art that many uses and design variations are possible for the child seat disclosed herein. The following detailed discussion of various alternative and preferred embodiments will illustrate the general principles of the invention. Other embodiments will be apparent to those skilled in the art given the benefit of this disclosure.

FIGS. 1 through 14 illustrate various embodiments of the present invention. A primary aspect of this invention shown in the figures is for a child seat. The term "child" includes a baby, an infant, and a child. The terminology "child seat" includes, without limitation, child seats for use in vehicles which use a vehicle lap and/or shoulder belt to secure the child seat to the vehicle and which have a separate child harness to secure the child in the child seat, child seats (sometimes called booster seats because they raise a child to a proper seating height for the vehicle shoulder belts) which use the vehicle lap and shoulder belts to secure the child in the child seat and secure the child seat to the vehicle, and child seats which can be used with a separate child harness when the child is younger and which can be used without a separate child harness when the child is older. The terminology "child seat" includes forward and rearward facing child seats. Additionally, as used herein, child seat may refer to other types of seats designed for seating children including high chair seats and stroller seats.

FIGS. 1 through 5 depict one embodiment of the present invention. Specifically, these figures show various views of the child seat with adjustable headrest unit. Generally, the adjustable headrest unit includes a headrest section 10 having a base member 12, a backrest section 14 having a receiving channel 16 adapted to receive the base member 12, a plurality of channel teeth 18 coupled to the receiving channel 16, and an adjustment lever 20 pivotally coupled to the base member 12 at a pivot point 22, the adjustment lever 20 having a trigger end 24 and a locking flange end 26. The base member 12 can be inserted into the receiving channel 16 to couple the headrest section 10 to the backrest section 14. Upon inserting the base member 12 into the receiving channel 16, the locking flange end 26 of the adjustment lever 20 may be engaged to the channel teeth 18 such that the base member 12 can no longer move toward or away from the backrest section 14.

This aspect of this embodiment of the present invention may be adjusted by utilizing the adjustment lever 20. When the base member 12 is received by the receiving channel 16, the locking flange end 26 of the adjustment lever 20 is typically biased toward the channel teeth 18. This bias may be the result of a spring or bias flange providing forces on the adjustment lever 20. Such forces result in the locking flange end 26 tending to engage the channel teeth 18, thus statically locking the base member 12 with the receiving channel 16. Disengaging the trigger end 24 causes the adjustment lever 20 to pivot about the pivot point 22 and simultaneously causes the locking flange end 26 to engage at least one of the plurality of channel teeth 18, thereby restricting a user from adjusting the headrest section 10 relative to and in the same plane as the backrest section 14. Furthermore, engaging the trigger end 24 causes the adjustment lever 20 to pivot about the pivot point 22 and simultaneously causes the locking flange end 26 to disengage from the plurality of channel teeth 18, thereby allowing a user to adjust the headrest section 10 relative to and in the same plane as the backrest section 14.

This embodiment may be adapted such that the locking flange end 26 may engage the one of a plurality of channel teeth 18. By doing this, the headrest section 10 may be moved to various distances relative to the backrest section 14. When a user places the headrest section 10 in the desired position relative to the backrest section 14, the locking flange end 26 may engage the corresponding channel tooth 18 to restrict further travel between the headrest section 10 and the backrest section 14.

This first embodiment may also include a safety belt guide 30 coupled to the headrest section 10, the safety belt guide 30 adapted to receive an automobile safety belt for securing the child seat to an automobile seat. This safety belt guide 30 will typically (but not limited to) receive a shoulder belt of an automobile safety belt. In one example, a shoulder belt of an automotive safety belt will travel from the point of attachment in the automobile, through the safety belt guide 30, over a shoulder of a child seated in the child seat, and attach to the safety belt receiver in the automobile. In another example, the shoulder belt of the safety belt may not be utilized to secure the child. Further, a child or other user of the present invention may utilize the light source 32 within the safety belt guide 30. Such a light source 32 may be a light emitting diode (LED) powered by at least one battery. This light source 32 may also have a switch 34 designed to allow or restrict the light source 32 from providing light. This switch 34 may be a button, a toggle, or a trigger. Other types of switches may also be utilized.

It is further of note that the headrest section 10, the backrest section 14, and the adjustment lever 20 may be made from at least one plastic or composite such as polypropylene. This also includes any other plastic or composite material known in the art.

Another aspect of a first embodiment includes a softgoods attachment 36 removably coupled to the headrest section 10. This softgoods attachment 36 may be made of foam, such as a polystyrene foam, polyurethane foam, or polyethylene foam. In one example, this may include Styrofoam© brand name foam. Alternatively, it may be made of padding or fabric or any other material considered soft or comfortable for receiving a child. Another aspect of this embodiment includes a fabric covering 38 permanently or removably coupled to the softgoods attachment 36. This fabric covering 38 may be made from synthetic or natural fabrics including cotton materials. This fabric covering 38 may be coupled to the softgoods attachment 36 by means of glue, epoxy, Velcro© attachment, elastic material, or any other attachment materials known in the art. Alternatively, the fabric may be opened to cover the softgoods attachment using a zipper or the like. Such fabric covering 38 may also include a padding material.

FIGS. 6 through 9 depict another embodiment of the present invention. Specifically, these figures show various views of the child seat with adjustable backrest unit. Generally, the adjustable backrest unit includes a lower backrest section 40, an upper backrest section 42 having a receiving channel 44 adapted to receive the lower backrest section 40, a plurality of receiving notches 46 coupled to the lower backrest section 40, and an adjustment lever 50 pivotally coupled to the upper backrest section at a pivot point 42, the adjustment lever 50 having a trigger end 54 and a locking flange end 56. The lower backrest section 40 can be inserted into the receiving channel 44 to couple the lower backrest section 40 to the upper backrest section 42. Upon inserting the lower backrest section 40 into the receiving channel 44, the locking flange end 56 of the adjustment lever 50 may be engaged to the receiving notches 46 such that the lower backrest section 40 can no longer move toward or away from the upper backrest section 42.

This aspect of this embodiment of the present invention may be adjusted by utilizing the adjustment lever 50. When the lower backrest section 40 is received by the receiving channel 44, the locking flange end 56 of the adjustment lever 50 is typically biased toward the receiving notches 46. This bias may be the result of a spring or bias flange providing forces on the adjustment lever 50. Such forces result in the locking flange end 56 tending to engage the receiving notches 46, thus statically locking the lower backrest section 40 with the receiving channel 44. Engaging the trigger end 54 causes the adjustment lever 50 to pivot about the pivot point 52 and simultaneously causes the locking flange end 56 to disengage from the plurality of receiving notches 46, thereby allowing a user to adjust the upper backrest section 42 relative to and in the same plane as the lower backrest section 40. Further, disengaging the trigger end 54 causes the adjustment lever 50 to pivot about the pivot point 52 and simultaneously causes the locking flange end 56 to engage at least one of the plurality of receiving notches 46, thereby restricting a user from adjusting the upper backrest section 42 relative to and in the same plane as the lower backrest section 40.

This embodiment may be adapted such that the locking flange end 56 may engage the one of a plurality of receiving notches 46. By doing this, the upper backrest section 42 may be moved to various distances relative to the lower backrest section 40. When a user places the upper backrest section 42 in the desired position relative to the lower backrest section 40, the locking flange end 56 may engage the corresponding receiving notch 46 to restrict further travel between the upper backrest section 42 and the lower backrest section 40.

It is further of note that the upper backrest section 42, the lower backrest section 40, and the adjustment lever 50 may be made from at least one plastic or composite such as polypropylene. This also includes any other plastic or composite material known in the art.

Another aspect of this embodiment includes a softgoods attachment 36 removably coupled to the upper backrest section 42. This softgoods attachment 36 may be made of foam, such as a polystyrene foam, polyurethane foam, or polyethylene foam. In one example, this may include Styrofoam© brand name foam. Alternatively, it may be made of padding or fabric or any other material considered soft or comfortable for receiving a child. Another aspect of this embodiment includes a fabric covering 38 permanently or removably coupled to the softgoods attachment 36. This fabric covering 38 may be made from synthetic or natural fabrics including cotton materials. This fabric covering 38 may be coupled to the softgoods attachment 36 by means of glue, epoxy, Velcro© attachment, elastic material, or any other attachment materials known in the art. Alternatively, the fabric may be opened to cover the softgoods attachment using a zipper or the like. Such fabric covering 38 may also include a padding material.

In yet another aspect of this embodiment, the lower backrest section 40 is removably coupled to the seatrest section 48. In view of this aspect, a child can sit on the seatrest section 48 while having back support from the combination of the lower 40 and upper backrest sections 42.

Figure 10:
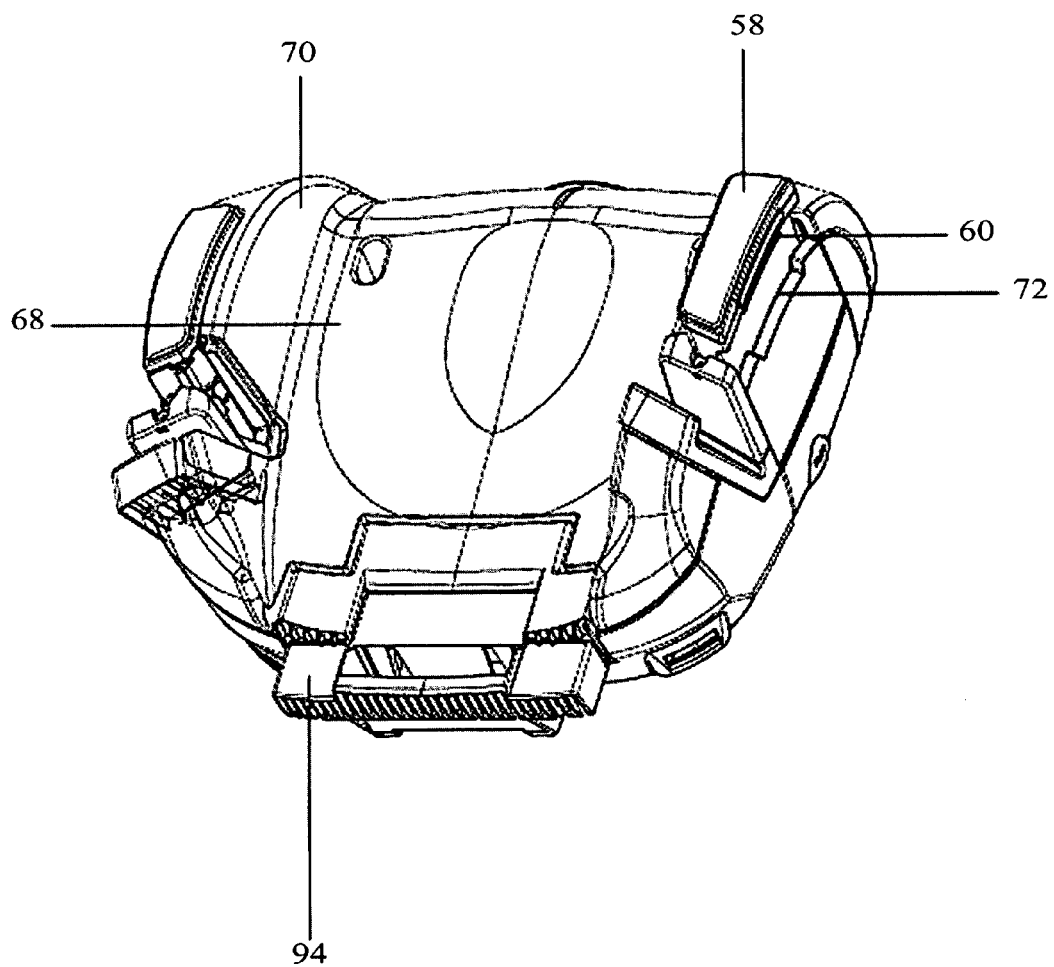
FIG. 10 is a rear perspective view of the seatrest unit including the adjustable armrest unit and the coupling mechanism of the adjustable lap depth.

FIG. 10 shows another embodiment of the present invention. Specifically, FIG. 10 depicts a view of the seatrest unit including the adjustable armrest unit and the coupling mechanism 94 of the adjustable lap depth. Generally, the adjustable armrest unit includes an armrest member 58, an adjustment lever 60 pivotally coupled to the armrest member 58 at a pivot point 62, the adjustment lever 60 having a trigger end 64 and a locking flange end 66, a seatrest section 68 having a side portion 70, a receiving channel 72, coupled to the side portion 70 of the seatrest section 68, adapted to receive the armrest member 58, and at least one receiving notch 74 coupled to the receiving channel 72.

This aspect of this embodiment of the present invention may be adjusted by utilizing the adjustment lever 60. When the armrest member 58 is received by the receiving channel 72, the locking flange end 66 of the adjustment lever 60 is typically biased toward the receiving notches 74. This bias may be the result of a spring or bias flange providing forces on the adjustment lever 60. Such forces result in the locking flange end 66 tending to engage the receiving notch 74, thus statically locking the armrest member 58 with the receiving channel 72. Engaging the trigger end 64 causes the adjustment lever 60 to pivot about the pivot point 62 and simultaneously causes the locking flange end 66 to disengage from the at least one receiving notch 74, thereby allowing a user to adjust the armrest member 58 relative to and in the same plane as the side portion 70 of the seatrest section 68. Further, disengaging the trigger end 64 causes the adjustment lever 60 to pivot about the pivot point 62 and simultaneously causes the locking flange end 66 to engage the at least one receiving notch 74, thereby restricting a user from adjusting the armrest member 58 relative to and in the same plane as the side portion 70 of the seatrest section 68.

It is further of note that the armrest member 58, the seatrest section 68, and the adjustment lever 60 may be made from at least one plastic or composite such as polypropylene. This also includes any other plastic or composite material known in the art.

Figure 11:
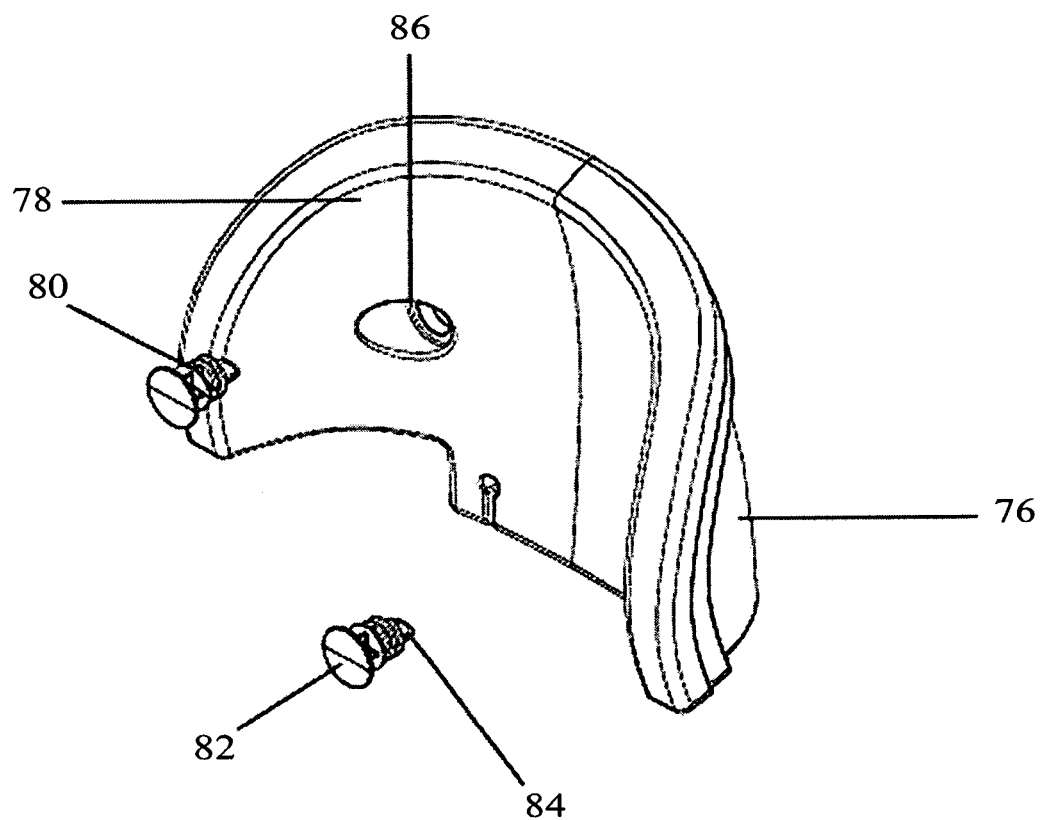
FIG. 11 is a perspective view of the softgoods attachment.
Figure 12:
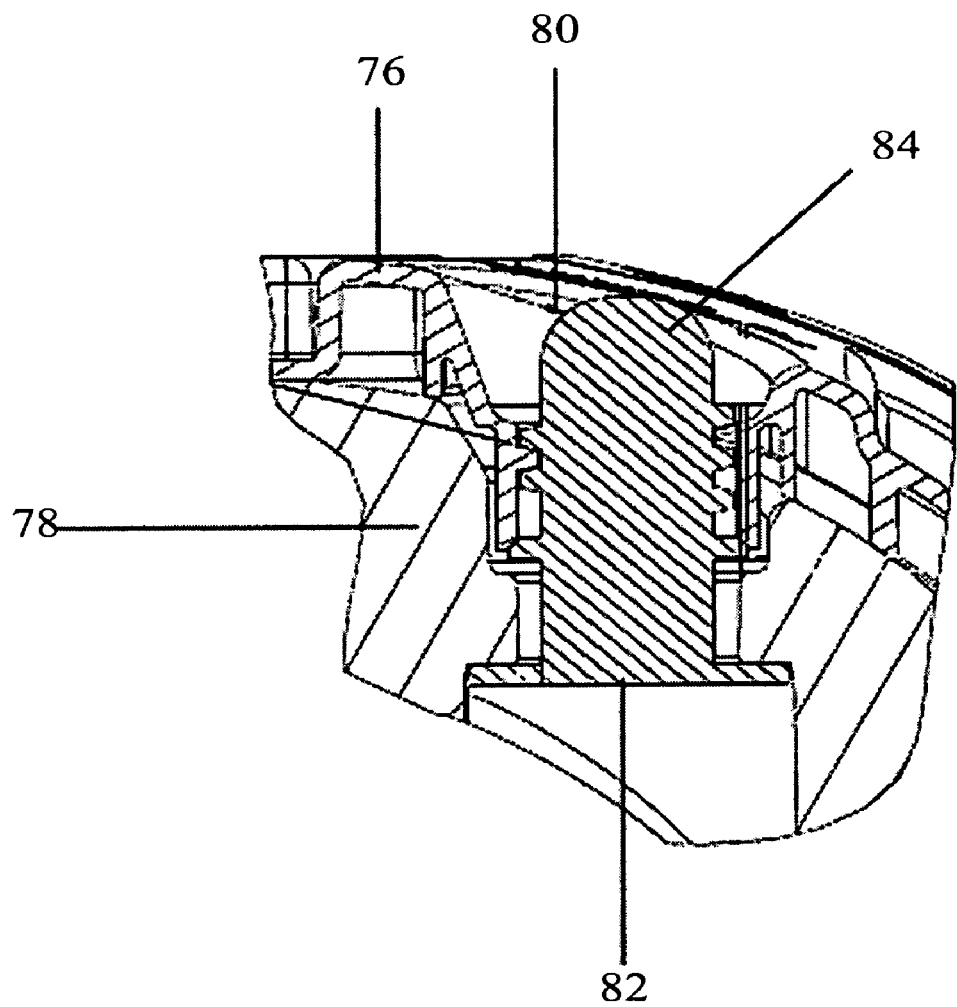
FIG. 12 is a cross-section view of the connector coupling the softgoods attachment with the child seat shell.

FIGS. 11 and 12 specifically depict examples of the softgoods attachment 36, 78 found in the various embodiments of the present invention, as described throughout this disclosure. Note that the softgoods attachment 36, 78 is also depicted in the other figures.

Generally, the child seat with softgoods attachment includes a child seat shell 76, a softgoods attachment 78, and at least one connector 80 coupled to the softgoods attachment 78, the at least one connector 80 having a base end 82 and a threaded end 84 such that the base end 82 has a larger diameter than the threaded end 84. The softgoods attachment 78 includes at least one softgoods opening 86 adapted to allow the threaded end 84 of at least one connector 80 to pass through the softgoods attachment 78, while restricting the base end 82 of the at least one connector 80. Further, the child seat shell 76 includes at least one shell opening 88 adapted to receive the threaded end 84 of the at least one connector 80. The softgoods attachment 78 is removably coupled to the child seat shell 76 by means of the at least one connector 80 without engaging or covering any of the edges, corners, or outer portions of the seat shell.

It is of note that the child seat shell 76 and at least one connector 80 may be made from at least one plastic or composite such as polypropylene. This also includes any other plastic or composite material known in the art.

This softgoods attachment 78 may be made of foam, such as a polystyrene foam, polyurethane foam, or polyethylene foam. In one example, this may include Styrofoam© brand name foam. Another aspect of this embodiment includes a fabric covering 38 permanently or removably coupled to the softgoods attachment 78. This fabric covering 38 may be made from synthetic or natural fabrics including cotton materials. This fabric covering 38 may be coupled to the softgoods attachment 78 by means of glue, epoxy, Velcro© attachment, elastic material, or any other attachment materials known in the art. Such fabric covering 38 may also include a padding material.

The connector 80 provides a means of easily attaching softgoods 78 to a child seat shell 76. While a threaded connector 80 is specifically disclosed herein, any other connector which operates to specifically anchor and hold the soft goods attachment 78 directly to the seat to provide a clean look without hooking over or around the edges of the seat shell would be operative and are considered within the scope of the invention. When a user wishes to connect the softgoods attachment 78 to the child seat 76, she may place the softgoods attachment 78 proximate a child seat shell 76, aligning the at least one connector 80 coupled to the softgoods attachment 78 with at least one shell opening 88 of the child seat shell 76. Next the user can easily screw the at least one connector 80 until the at least one connector 80 engages the at least one shell opening 88. The user should continue tightening the at least one connector 80 until screwing of the at least one connector 80 and the at least one shell opening 88 can no longer occur. The twisting action may be done in a clockwise or counter-clockwise manner. The result may be tightening or loosening of the softgoods attachment 78 from the child seat shell 76, depending on the connector 80 design.

In any of the embodiments, softgoods attachments 78 may be coupled to various sections or members of the child seat 76 or child seat shell 76. This coupling provides comfort to a child using said child seat 76.

Figure 13:
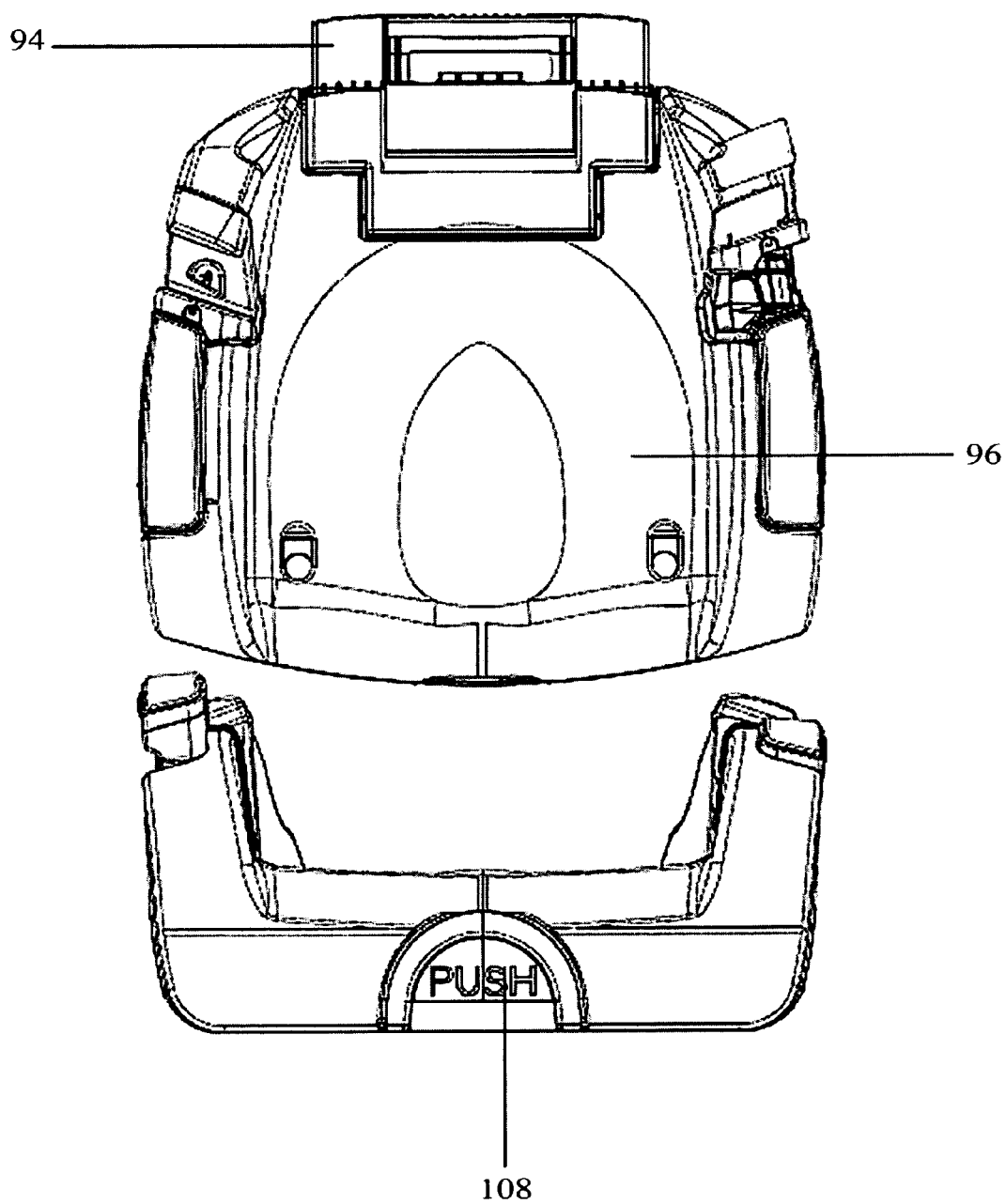
FIG. 13 is a top and front view of the seatrest section.
Figure 14:
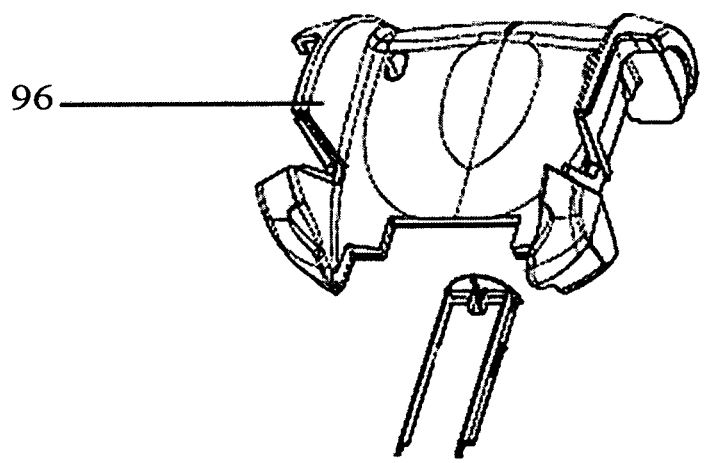
FIG. 14 is an exploded perspective view of the seatrest section.
Figure 14:
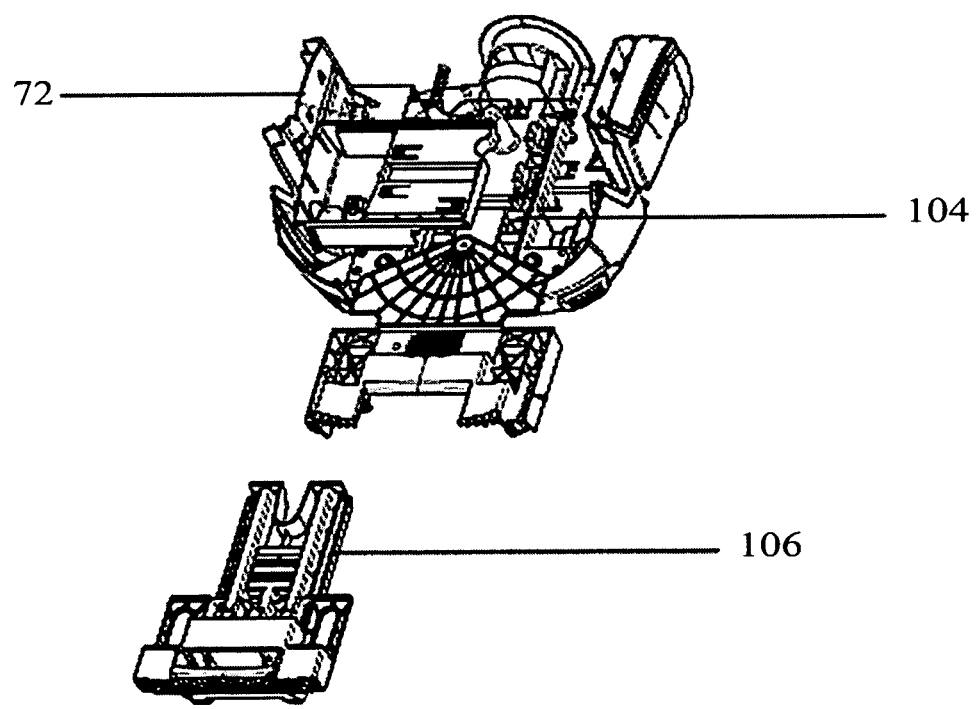

FIGS. 13 and 14 depict another embodiment of the present invention. Specifically, these figures show various views of the child seat with adjustable lap depth. Generally, the adjustable lap depth includes a backrest section 90 having a top end and a bottom end, a coupling mechanism 94, a seatrest section 96, the seatrest section 96 having a front end 98, a back end 100 removably coupled to the coupling mechanism 94, a locking flange 102 coupled to the receiving channel 104, and a receiving channel 104 adapted to receive the coupling mechanism 94, at least one receiving notch 106 coupled to the coupling mechanism 94, and an adjustment mechanism 108 coupled to the front end of the seatrest section 96.

This aspect of this embodiment of the present invention may be adjusted by utilizing the adjustment mechanism 108. When the coupling mechanism 94 is received by the receiving channel 104, the locking flange 102 is typically biased toward the receiving notches 106. Such forces result in the locking flange 102 tending to engage the receiving notches 106, thus statically locking the coupling mechanism 94 with the receiving channel 104. The receiving channel 104 of the seatrest section 96 is slidably coupled to the coupling mechanism 94. Engaging the adjustment mechanism 108 causes the locking flange 102 to disengage from the at least one receiving notch 106, thereby allowing a user to adjust the seatrest section 96 relative to the backrest section 90. Further, disengaging the adjustment mechanism 108 causes the locking flange 102 to engage the at least one receiving notch 106, thereby restricting a user from adjusting the seatrest section 96 relative to the backrest section 90.

This embodiment may be adapted such that the locking flange 102 may engage the one of a plurality of receiving notches 106. By doing this, the seatrest section 96 may be moved to various distances relative to the coupling mechanism 94. When a user places the seatrest section 96 in the desired position relative to the coupling mechanism 94, the locking flange 102 may engage the corresponding receiving notch 106 to restrict further travel between the seatrest section 96 and the coupling mechanism 94.

It is further of note that the backrest section 90, the coupling mechanism 94, the seatrest section 96, and the adjustment mechanism 108 may be made from at least one plastic or composite such as polypropylene. This also includes any other plastic or composite material known in the art.

Another aspect of this embodiment includes a softgoods attachment 78 removably coupled to each of the backrest section 90 and seatrest section 96. This softgoods attachment 78 may be made of foam, such as a polystyrene foam, polyurethane foam, or polyethylene foam. In one example, this may include Styrofoam© brand name foam. Another aspect of this embodiment includes a fabric covering 38 permanently or removably coupled to the softgoods attachment 78. This fabric covering 38 may be made from synthetic or natural fabrics including cotton materials. This fabric covering 38 may be coupled to the softgoods attachment 78 by means of glue, epoxy, Velcro© attachment, elastic material, or any other attachment materials known in the art. Such fabric covering 38 may also include a padding material.

The apparatuses, uses, and methods disclosed herein have been described without reference to specific hardware. However, the apparatuses, uses, and methods disclosed herein have been described in a manner sufficient to enable persons of ordinary skill in the art to readily adapt commercially available hardware as may be needed to reduce any of the embodiments of the present invention to practice without undue experimentation.

It will be appreciated by persons skilled in the art that the present invention is not limited to what has been particularly shown and described in herein. The scope of the present invention is defined only by the claims which follow.

What is claimed is:

1. A child seat with adjustable headrest unit, comprising:
   a headrest section having a base member;
   a backrest section having a receiving channel adapted to receive the base member;
   a plurality of channel teeth coupled to the receiving channel;
   an adjustment lever pivotally coupled to the base member at a pivot point located on a back portion of said backrest section, the adjustment lever having a trigger end and a locking flange end; and
   a softgoods attachment removably coupled to the headrest section by a removable coupling;
   wherein engaging the trigger end causes the adjustment lever to pivot about the pivot point and simultaneously causes the locking flange end to disengage from the plurality of channel teeth, thereby allowing a user to adjust the headrest section relative to and in the same plane as the backrest section;
   wherein disengaging the trigger end causes the adjustment lever to pivot about the pivot point and simultaneously causes the locking flange end to engage at least one of the plurality of channel teeth, thereby restricting a user from adjusting the headrest section relative to and in the same plane as the backrest section; and
   wherein the removable coupling includes a twist mechanism.

2. The child seat with adjustable headrest unit of claim 1, further comprising:
   a fabric covering permanently coupled to the softgoods attachment.

3. The child seat with adjustable headrest unit of claim 1, further comprising:
   a fabric covering removably coupled to the softgoods attachment.

4. A child seat with adjustable backrest unit, comprising;
   a lower backrest section;
   an upper backrest section having a receiving channel adapted to receive the lower backrest section;
   a plurality of receiving notches coupled to the lower backrest section;
   an adjustment lever pivotally coupled to the upper backrest section at a pivot point located on a back portion of said backrest section, the adjustment lever having a trigger end and a locking flange end; and
   a softgoods attachment removably coupled to the upper backrest section by a removable coupling;
   wherein engaging the trigger end causes the adjustment lever to pivot about the pivot point and simultaneously causes the locking flange end to disengage from the plurality of receiving notches, thereby allowing a user to adjust the upper backrest section relative to and in the same lane as the lower backrest section;
   wherein disengaging the trigger end causes the adjustment lever to pivot about the pivot point and simultaneously causes the locking flange end to engage at least one of the plurality of receiving notches, thereby restricting a user from adjusting the upper backrest section relative to and in the same plane as the lower backrest section;
   wherein the removable coupling includes a twisting mechanism.

5. The child seat with adjustable backrest unit of claim 4, wherein
   the softgoods attachment is made from one of polystyrene foam, polyurethane foam, or polyethylene foam.

6. The child seat with adjustable backrest unit of claim 4, further comprising:
  a fabric covering permanently coupled to the softgoods attachment.

7. The child seat with adjustable backrest unit of claim 4, further comprising:
  a fabric covering removably coupled to the softgoods attachment.

8. The child seat with adjustable backrest unit of claim 4, further comprising:
  a seatrest section, adapted for a child to sit upon the seatrest section, wherein seatrest section is removably coupled to the lower backrest section.

9. A child seat with adjustable headrest unit, comprising:
  a headrest section having a base member;
  a backrest section having a receiving channel adapted to receive the base member;
  a plurality of channel teeth coupled to the receiving channel;
  an adjustment lever pivotally coupled to the base member at a pivot point located on a back portion of said backrest section, the adjustment lever having a trigger end and a locking flange end; and
  a leaf spring attached to said adjustment lever for resiliently biasing said locking flange end to engage at least one of said plurality of channel teeth;
  wherein engaging the trigger end causes the adjustment lever to pivot about the pivot point and simultaneously causes the locking flange end to disengage from the plurality of channel teeth, thereby allowing a user to adjust the headrest section relative to and in the same plane as the backrest section; and
  wherein disengaging the trigger end causes the adjustment lever to pivot about the pivot point and simultaneously causes the locking flange end to engage at least one of the plurality of channel teeth, thereby restricting a user from adjusting the headrest section relative to and in the same plane as the backrest section.

10. A child seat with adjustable backrest unit, comprising:
  a lower backrest section;
  an upper backrest section having a receiving channel adapted to receive the lower backrest section;
  a plurality of receiving notches coupled to the lower backrest section; and
  an adjustment lever pivotally coupled to the upper backrest section at a pivot point located on a back portion of said backrest section, the adjustment lever having a trigger end and a locking flange end; and
  a leaf spring attached to said adjustment lever for resiliently biasing said locking flange end to engage at least one of said plurality of channel teeth;
  wherein engaging the trigger end causes the adjustment lever to pivot about the pivot point and simultaneously causes the locking flange end to disengage from the plurality of receiving notches, thereby allowing a user to adjust the upper backrest section relative to and in the same plane as the lower backrest section; and
  wherein disengaging the trigger end causes the adjustment lever to pivot about the pivot point and simultaneously causes the locking flange end to engage at least one of the plurality of receiving notches, thereby restricting a user from adjusting the upper backrest section relative to and in the same plane as the lower backrest section.

* * * * *